United States Patent [19]

Stallbohm

[11] Patent Number: 5,682,134
[45] Date of Patent: Oct. 28, 1997

[54] METHOD OF OPERATING A DEVICE FOR MONITORING THE INTERIOR OF AN AUTOMOTIVE VEHICLE

[75] Inventor: Uwe Stallbohm, Wuppertal, Germany

[73] Assignee: Kiekert AG, Heiligenhaus, Germany

[21] Appl. No.: 633,412

[22] Filed: Jun. 10, 1996

[30] Foreign Application Priority Data

Aug. 18, 1995 [DE] Germany ............... 195 30 729.1

[51] Int. Cl.$^6$ ............................................. B60R 25/10
[52] U.S. Cl. ................. 340/426; 340/514; 340/552; 340/565; 340/567; 367/93; 367/94
[58] Field of Search .................... 340/514, 515, 340/506, 516, 551, 552, 553, 554, 561, 565, 562, 563, 564, 567; 367/93, 94, 199

[56] References Cited

U.S. PATENT DOCUMENTS 4,743,886  5/1988  Steiner et al. ............... 340/514

FOREIGN PATENT DOCUMENTS 90 03 065  12/1990  Germany.

Primary Examiner—Jeffery Hofsass
Assistant Examiner—Daryl C. Pope
Attorney, Agent, or Firm—Herbert Dubno

[57] ABSTRACT

A method of operating a system for monitoring the interior of a motor vehicle in which a rest signal amplitude is measured for the acoustic receiver or receivers in the absence of sound and is stored in memory while an actual reading is taken of the measured signal again in the absence of sound within the vehicle interior and this letter value is compared to the first and an error register is set if the measured value is outside a stored window.

9 Claims, 1 Drawing Sheet

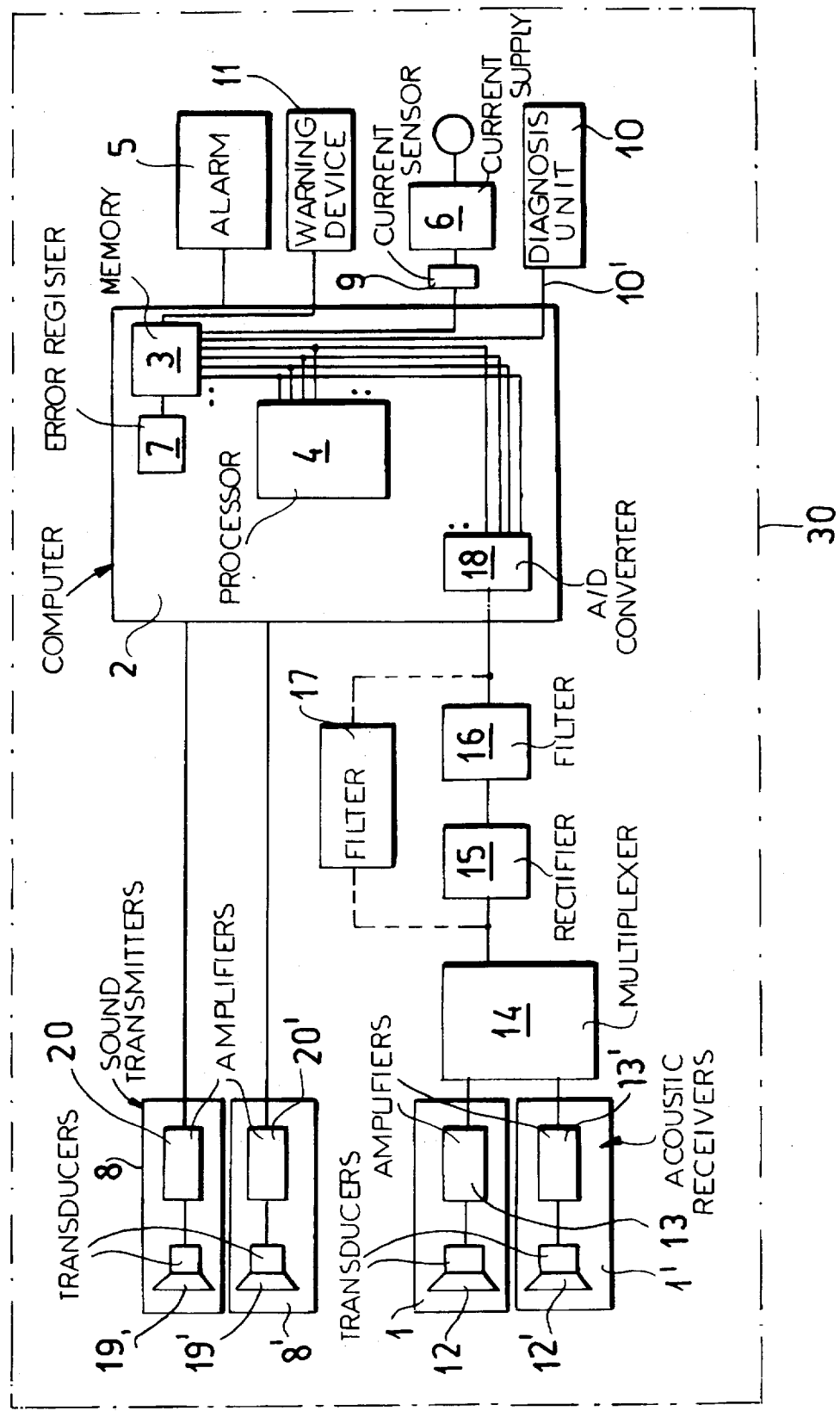

METHOD OF OPERATING A DEVICE FOR MONITORING THE INTERIOR OF AN AUTOMOTIVE VEHICLE

FIELD OF THE INVENTION

The present invention relates to a method of operating a device for monitoring the interior of a motor vehicle and, more particularly, to a method of monitoring which involves an initialization and self testing so that, at least, a possible failure of an acoustic receiver can be detected.

BACKGROUND OF THE INVENTION

To monitor the interior of a vehicle, the vehicle has been provided heretofore with an acoustic receiver for receiving sound which may be transmitted in the vehicle interior through the air therein or as body waves through parts of the vehicle body, and for converting the received sound into an electrical measurement signal. A computer unit of the system is connected to the receiver and has a processor and a memory, sample signals being stored in the memory. An alarm device is connected to the computer for issuing an alarm signal and the computer is provided with a current supply. The alarm device is activated by the computer upon a comparison of received measurement signals with one or more sample signals stored in the computer and indicating an incursion into the interior space of the vehicle.

The acoustic receiver generally comprises a transducer or converter which performs the actual conversion of received sound into electrical signals, and an amplifier connected to that converter or transducer for amplifying the electrical signals. The acoustic transducer may respond to sound in the audible range and/or sound in an ultrasonic range. Sound can basically be transmitted through any gaseous medium, usually air in the case of the interior of the motor vehicle, but is also transmitted as body waves through solid structures of the vehicle body.

The electrical oscillation signals recovered from the acoustic transducer are processed by the amplifier to electrical signals which themselves can be further processed. The amplifier usually is of an analog type.

The alarm device associated with the computer and provided for a motor vehicle operates generally as an acoustic and/or optical signal emitter. It can utilize the horn of the vehicle and/or the lights thereof. However, signal producing elements can be provided for the alarm which are independent of the electrical system of the motor vehicle.

An alarm device can also emit a wireless signal, e.g. radio waves which can be picked by a receiver spaced from the vehicle.

The computer unit comprising the processor and the memory can in principle operate on an analog basis but preferably are digital. When a digital computer unit is utilized, the electrical measurement signal before being fed to the computer unit or as it is being fed to the computer unit must be transformed by analog/digital conversion into a digital measurement signal.

Utilizing an apparatus of the aforedescribed type and conventional interior monitoring processes, an incursion into the interior of the vehicle can be detected and will cause the alarm device to emit its alert signal. The incursion into the interior of the vehicle can involve the breaking of a glass window of the vehicle, or the insertion of a metal probe for unauthorized activation of the lock system, or simply the entry of an unauthorized person through the vehicle door or by reaching into the vehicle.

A process for operating anti-incursion system for the interior of a motor vehicle has been described in DE-U-9 003 065.6. This system is a so-called passive system whereby a measured signal is compared to a sample signal. The sample signal may represent the breaking of a vehicle window, the shattering of glass, while the measured signal may result from an attempted incursion by the breaking of a vehicle window.

An acoustic transmitter in the vehicle can send out a primary sound wave pulse in an active operation, whereby that sound wave pulse is radiated and reflected throughout the interior of the vehicle so that superimposed sound is picked up by the receiver and compared with a sample signal representing the state prior to the incursion.

These systems allow changes in the interior space of a motor vehicle to be detected and monitored. While the earlier processes have been found to be largely satisfactory, in practice I have found that the reliability of the system against failure of components thereof may not be sufficient and that the system generally is incapable of detecting failure of components. This is especially problematical since, with operation in a passive mode, a defect in the sound receivers cannot be readily ascertained. Furthermore, one could conclude, not knowing of a possible failure of the receiver or receivers, for example, that the monitoring system is effective when it is not. In any case, when there is a defect, the antitheft protection for the vehicle is not available and that fact may be unknown to the user.

OBJECTS OF THE INVENTIONS

It is, therefore, the principal object of the present invention to provide an improved method of operating a monitoring system of the type described, whereby earlier drawbacks are avoided.

Another object of this invention is to provide an improved device for reliably monitoring the interior space of a motor vehicle.

SUMMARY OF THE INVENTION

These objects and others which will become apparent hereinafter are attained, in accordance with the invention by determining, upon an initialization of the system and effecting a self test thereof, a reset signal amplitude at a state in which there is practically sound in the interior of the vehicle and setting an earlier register of the computer depending upon a comparison of the reset signal amplitude (in terms of the corresponding measured electrical signal) with a predetermined stored permissible reset signal amplitude.

The initialization can be the process resulting from a reset for preparation of the apparatus for regular operation. Such a reset can be effected in any operating state of the system. Usually the reset is a so-called automatic reset which is automatically effected with a switching on or activation of the system.

The initialization can, however, be triggered from an external unit, for example, by a diagnosis device which can be connected to the computer through the diagnosis terminal thereof.

When I referred to a rest signal amplitude, I mean to so indicate the amplitude of the electrical signal derived from the amplifier which receives the measured electrical signal from the acoustic transducer in a state of the latter in which the acoustic transducer is not excited by sound. In the usual case, the rest signal amplitude of the ordinary acoustic receiver is very small but different from zero based upon the noise of the signal. If an 8 bit amplitude resolution is effected, the resolution of the signal can be of 255 discrete levels with the rest signal amplitude typically being of not more than four such levels or the fourth level if the maximum rest signal amplitude is considered. In this case, the permissible rest signal amplitude can correspond, for example, to level four. A rest signal amplitude of zero or practically zero is not permissible since an acoustic receiver that produces no noise is defective.

Since the present invention operates with a permissible rest signal amplitude window with the error register being set when a minimal rest signal amplitude which is typical of the acoustic receiver is not reached, the error register will signal a failure of the receiver.

The invention utilizes the fact that commercially available acoustic receivers for the purposes described typically have rest signal amplitudes if their ordinary functions are effective. Significant deviations of the rest signal amplitude, i.e. rest signal amplitudes far greater than the window or close to zero and thus below the window, signify failure of the receiver or some kind of spurious sound effecting the receiver so that, upon detection of such conditions, the error register is set. Based upon the contents of the error register, when the latter is read, it is possible to determine whether the failure is not one of the receivers or elsewhere.

The criterium that the sound be substantially absent at the time the rest signal amplitude is measured, insures that the measured electrical signal will be a true rest signal.

The rest signal amplitude is measured starting at a point at which a specified time interval $t_1$ commences and then for the duration of this time interval, the time interval commencing at a point at which the measurement signal falls below the permissible rest signal amplitude, i.e. no sound disturbance is picked up by the receiver.

The self test that is carried out can be effected in various ways. In operation of the system for monitoring the interior of the vehicle in the embodiment in which a sound transmitter emits primary sound wave pulses into the interior, upon initialization of the device a self test can be carried out utilizing the primary sound wave pulse emitted initially by the transmitter. The sounds reflected and superimposed on one another in the interior of the vehicle are picked up by the receiver or transducer and transformed into an electrical measurement signal. The time course of the electrical measurement signal is determined and an error register of the computer is set depending upon a comparison of the time course of the measured signal with a predetermined and stored reference time course for a given primary sound wave pulse duration.

In this embodiment, the invention makes use of the fact that after the emission of a primary sound wave pulse, the measured signal jumps above the permissible rest signal amplitude within a predetermined time period $t_2$ and then decays below the permissible rest signal amplitude after a time period $t_3$ when the sound emitter and acoustic receiver function properly. The durations $t_2$ and $t_3$ depend upon the size and configuration of the interior of the vehicle and thus are values which are typical of a motor vehicle and are readily determined and stored to provide the reference time course.

In this embodiment, moreover, instead of determining the time course of the measured signals or in addition thereto, the signal strength of the measured signal is determined whereby the error register of the computer is set based upon a comparison of the signal strength of the measured signal with a predetermined signal strength window.

In this case, the invention uses the fact that, for proper radiation of a primary sound wave pulse and proper reception of the sound wave the signal strength of the measured signal must have a certain minimum value. If the signal strength after receipt of the sound wave is equal to the rest signal amplitude or untypically low, there is either a defect in the sound transmitter and/or in the sound receiver. The signal strength also must not exceed a maximum value.

In a preferred embodiment of the invention, the computer can carry out a program-controlled self test of all of the components described. In this case, a differentiation can be made as to failure functions of the sound receiver or the sound transmitter and of the computer itself.

According to a further embodiment of the invention, a current amplitude sensor is connected to signal the current drain of the system and an error register of the computer is set upon a comparison of the determined current drain with a predetermined stored allowable current drain window. The current drain window can represent the current drain typical for the particular construction of a fully functional device under the usual operating conditions.

In this embodiment, the error function can also be localized by activating different components of the device via the computer in succession and the respective current drains compared with corresponding current drain windows.

Advantageously, the error register or error registers are read by a diagnostic device connected via the diagnosis terminal to the computer and the register contents are displayed. With the aid of the display tapped from the diagnosis terminals a defective component of the device can be readily determined and replaced or repaired. It has been found to be advantageous, moreover, for the setting of at least one error register to trigger via the computer, the operation of a warning device in the vehicle. This can allows an operator to know that a failure function of the system has occurred and that restoration of the anti-theft protection can require a visit to a service station.

A method of operating a system for monitoring a motor vehicle interior can thus comprise the steps of:

(a) storing in the memory, sample signals representing a permissible rest signal amplitude of the acoustic receiver in substantial absence of sound waves;

(b) initializing the system and subjecting the system to a selftesting in which a rest signal amplitude of a test electrical measurement signal is determined for the acoustic receiver;

(c) comparing the rest signal amplitude of the test electrical measurement signal with the sample signals stored in the memory; and (d) setting an error register upon a deviation of the rest signal amplitude of the test electrical measurement signal from the sample signals stored in the memory.

BRIEF DESCRIPTION OF THE DRAWING

The above and other objects, features, and advantages will become more readily apparent from the following description, reference being made to the accompanying drawing, the sole FIGURE of which is a block diagram of a device or system for monitoring the interior of a motor vehicle and with which the method of the invention can be practiced.

SPECIFIC DESCRIPTION

In the drawing, I have shown a plurality of acoustic receivers 1, 1' for picking up sound waves in the interior of a motor vehicle, represented by the dot dash enclosure 30, and converting the sound waves into an electrical measurement signal. Each acoustic receiver 1, 1' comprises a transducer 12, 12' connected to an amplifier 13, 13'. The outputs of the acoustic receivers 1, 1' are connected to inputs of a multiplexer 14.

The output of multiplexer 14 is connected with the computer 2 via a rectifier 15 and a filter 16. Alternatively the multiplexer 14 can be connected to the computer 2 directly by a filter 17.

The computer unit 2 comprises, inter alia, a processor 3, a memory 4, an analog digital converter 18 for converting the measurement signals into binary data sets, and an error register 7.

An alarm 5 is connected to the computer as is electrical current supply 6 which can be the battery and alternator system of the motor vehicle. The alarm 5 can be a conventional alarm providing an acoustic and/or electrical light output for the motor vehicle. The alarm 5 and the current supply 6, however, also can be independent from the electrical system of the motor vehicle itself.

The system of the invention can additionally comprise sound transmitters 8, 8', each of which can include an electrical acoustic transducer 19 or 19' connected to a power driver 20, 20', for example, an amplifier, for reducing primary sound wave pulses as triggered by the computer two into the interior 30 of the vehicle. The drivers 20, 20' are controllable by the computer 2 which has, within the interior of the vehicle 30, a warning device 11 which can be an optical indicator on the dashboard signalling a problem with the system shown in the drawing.

Connected to the computer 2 is also a diagnosis terminal 10' to which a diagnosis unit 10 may be coupled.

Between the current supply source 6 and the computer 2, an electronic current sensor 9 is provided.

In the initialization of the system and the self test which is effected upon such initialization, at the outset for each of the second receivers 1, 1', the rest signal amplitude of the respective electrical measurement signal practically in the absence of sound in the vehicle interior is determined for a time period $t_1$.

If the rest signal amplitude is zero or practically zero, the error register 7 is set for the respective receiver 1, 1'. If the rest signal amplitude is higher than a permissible rest signal amplitude stored in the memory 3, a sound defect is recognized and the time period $t_1$ does not run. As soon as the disturbing sound no longer is detected and the measured rest signal amplitude falls below the permissible rest signal amplitude, the time period $t_1$ begins.

After determination of the rest signal amplitude, one or both of the sound transmitters 8, 8' generates a primary sound wave pulse which is reflected in the interior of the motor vehicle and superimposed sound waves are transformed into electrical measurement signals by means of the sound receivers 1, 1'.

The time course of the measurement signal is detected in the computer 2 and the error register 7 of the computer 2 is set when the measured signal does not rise above the permissible rest signal amplitude within the predetermined time duration $t_1$ and/or the measured signal does not fall during a time interval $t_2$ following the time interval $t_1$ back to the rest signal amplitude. In this case a comparison with sample signals is not required.

By separate evaluation of the electrical measurement signals from the sound receivers 1, 1', a differentiation can be made. If the time course for all measured signals is not permissible, there is, to a high degree of probability a failure of each of the transmitters 8, 8' which have emitted the primary sound wave pulse. If, however, the time course of only one of the measurement signals is not permissible, the receiver from which that measured signal was obtained has a defect. Thus the components of the system can have errors recorded in different parts of the error register.

Apart from the duration of the measured signal or in addition to the duration of the measured signal, the signal strength of the measured signal can be obtained and compared with a previously obtained and predetermined signal strength window. If one of the signal strengths obtained from the receivers 1, 1' is not within the signal strength window, the corresponding receiver 1 is defective. If all of the signal strengths from the various receivers 1, 1' lie outside the signal strength window, then there is, to a high degree of probability, a defect in the previously activated sound transmitter 8, 8'. The process as thus carried out for one activated transmitter 8 can then be repeated for the second or further transmitters 8' so that a clear differentiation between possible error functions of the sound transmitters 8, 8' is possible.

As a consequence, error functions of the acoustic receivers 1, 1' and/or the acoustic transmitters 8, 8' cannot only be determined but also clearly localized and the corresponding components repaired or replaced.

While the warning device 11 lets the operator know that the system is defective since it is triggered when an error state is recorded by the error register, when the error register 7 is read via the diagnosis 10' by a diagnosis device 10 at the service station, the register contents can signal which component has failed to enable a rapid replacement thereof.

The current amplitude sensor determines the current demand of the system with the error register 7 being set by comparison with a predetermined current drain which can be stored in memory or a predetermined and stored permissible current drain window. In this manner, I can determine with great reliability a failure in one of the transmitters 8, 8' or both based upon impermissible current drain. The sensors 8, 8' can be tested separately and the compared effects with respective current drain windows.

I claim:

1. A method of operating a system for monitoring a motor-vehicle interior, the system comprising at least one acoustic receiver for receiving sound waves propagated in the motor-vehicle interior and for converting received sound waves into an electrical measurement signal, a computer connected to said acoustic receiver and including a processor and a memory, an alarm unit for emitting an alarm signal, and an electric current supply, said method comprising the steps of:
    (a) initializing said system and subjecting said system to a selftesting with emission into said motor-vehicle interior of a primary sound wave pulse from at least one acoustic transmitter, said primary sound wave pulse being reflected in the motor-vehicle interior;
    (b) determining respective time courses of electrical measurement signals of received reflected superposed sound waves at said receiver deriving from said primary sound wave pulse;
    (c) comparing said time courses with a predetermined stored reference time course in said memory; and
    (d) setting an error register based upon the comparison in step (c).

2. The method defined in claim 1 wherein a signal strength of said electrical measurement signal is determined and said error register is set based upon a comparison of the signal strength of the electrical measurement and a predetermined signal-strength window.

3. The method defined in claim 1 wherein said computer is programmed to effect selftesting of components thereof.

4. The method defined in claim 1, further comprising the step of determining electric current magnitude supplied to the system and setting an error register based upon agreement between said determined electric current magnitude and a predetermined stored permissible current takeup window.

5. The method defined in claim 1 wherein the initialization of the system is effective any time the system is turned on.

6. The method defined in claim 1 wherein the initialization of the system is effected by a diagnostic device connected by a diagnosis terminal to the computer.

7. The method defined in claim 1, further comprising the steps of reading out contents of said register via a diagnosis device connected to a diagnosis terminal of said computer wherein the initialization of the system is effected by a diagnostic device connected by a diagnosis terminal to the computer, and displaying said contents of the register.

8. The method defined in claim 1, further comprising the step activating a warning unit on the motor vehicle upon the setting of at least one error register.

9. A method of operating a system for monitoring a motor-vehicle interior, the system comprising at least one acoustic receiver for receiving sound waves propagated in the motor-vehicle interior and for converting received sound waves into an electrical measurement signal, a computer connected to said acoustic receiver and including a processor and a memory, an alarm unit for emitting an alarm signal, and an electric current supply, said method comprising the steps of:

(a) storing in said memory, sample signals representing a permissible rest signal amplitude of said acoustic receiver in substantial absence of sound waves;

(b) initializing said system and subjecting said system to a selftesting in which a rest signal amplitude of a test electrical measurement signal is determined for said acoustic receiver;

(c) comparing the rest signal amplitude of said test electrical measurement signal with said sample signals stored in said memory;

(d) setting an error register upon a deviation of the rest signal amplitude of said test electrical measurement signal from said sample signals stored in said memory;

(e) reading out contents of said register via a diagnosis device connected to a diagnosis terminal of said computer wherein the initialization of the system is effected by said diagnosis device connected to said diagnosis terminal to the computer; and (f) displaying said contents of the register.

* * * * *